United States Patent [19]
Barabino

[11] 3,890,595
[45] June 17, 1975

[54] ALARM SYSTEM FOR PNEUMATIC TIRES
[75] Inventor: William A. Barabino, North Reading, Mass.
[73] Assignee: Safety Research & Engineering Corporation, North Reading, Mass.
[22] Filed: June 6, 1973
[21] Appl. No.: 367,393

Related U.S. Application Data
[62] Division of Ser. No. 145,624, May 21, 1971, Pat. No. 3,738,308.

[52] U.S. Cl. ............ 340/58; 73/146.5; 73/146.8; 116/34 R; 340/60
[51] Int. Cl. ........................................... B60c 23/00
[58] Field of Search ...... 340/58, 60, 148; 116/34 R, 116/70; 73/146.3, 146.5, 146.8

[56] References Cited
UNITED STATES PATENTS

| | | | |
|---|---|---|---|
| 1,151,044 | 8/1915 | Relyea | 116/34 R |
| 1,769,508 | 7/1930 | Harned | 116/34 R |
| 2,556,586 | 6/1951 | Johnston | 340/148 |
| 3,489,998 | 1/1970 | O'Neal et al. | 340/58 |
| 3,613,075 | 10/1971 | Griffiths et al. | 340/58 |

Primary Examiner—John W. Caldwell
Assistant Examiner—Joseph E. Nowicki
Attorney, Agent, or Firm—Morse, Altman, Oates & Bello

[57] ABSTRACT

A system is provided for use with various types of vehicles employing pneumatic tires to signal the operator that the tire pressure is beyond a preset range. A spring-loaded pressure responsive piston is adapted to reciprocate within a valve structure in response to changes in tire pressure. If the piston is displaced one way or other beyond the predetermined range, air is released to operate a whistle detected by a sensing system on the vehicle which, in turn, generates a signal for the operator.

5 Claims, 5 Drawing Figures

ALARM SYSTEM FOR PNEUMATIC TIRES

This is a division of application Ser. No. 145,624, filed May 21, 1971, now U.S. Pat. No. 3,738,308.

BACKGROUND OF THE INVENTION

1. Field of the Invention

This invention relates generally to tire pressure alarm systems and more particularly is directed towards an electro-sonic system for warning of excessive gain or loss of pressure in a pneumatic tire.

2. Description of the Prior Art

One of the major problems of highway accidents arises from tire failures, often caused by running a tire at a pressure above or below a predetermined safe range. Not only is it dangerous to operate a tire beyond its optimum pressure, but such practice greatly reduces the useful life of the tire since the tire will wear unevenly and at a faster rate if the pressure is not maintained within specified limits.

Various types of systems have been developed heretofore for the purpose of signaling the operator that the tire pressure of the vehicle is beyond a specified range. Such systems have not been generally adopted in practice, because of mechanical and electrical complexities, high cost of fabrication, installation and maintenance as well as general unreliability. Accordingly, it is an object of the present invention to provide a new and improved tire pressure alarm system which is of simple, low cost construction, extremely durable and reliable and one which may be readily installed in existing vehicles.

SUMMARY OF THE INVENTION

This invention features a tire pressure alarm system, comprising a cylinder mounted to the wheel and communicating with the interior of the tire and a spring-loaded piston mounted for reciprocation within the cylinder and formed with a passage therein. A valve body encompassing an extension of the piston is formed with spaced ports communicating with the atmosphere through a whistle whereby excessive axial displacement of the piston in either direction as the result of a change in tire pressure will cause air to be released to operate the whistle. A sensing system is mounted on the vehicle to respond to the sonic signal and alert the operator.

DETAILED DESCRIPTION OF THE PREFERRED EMBODIMENT

Figure 1:
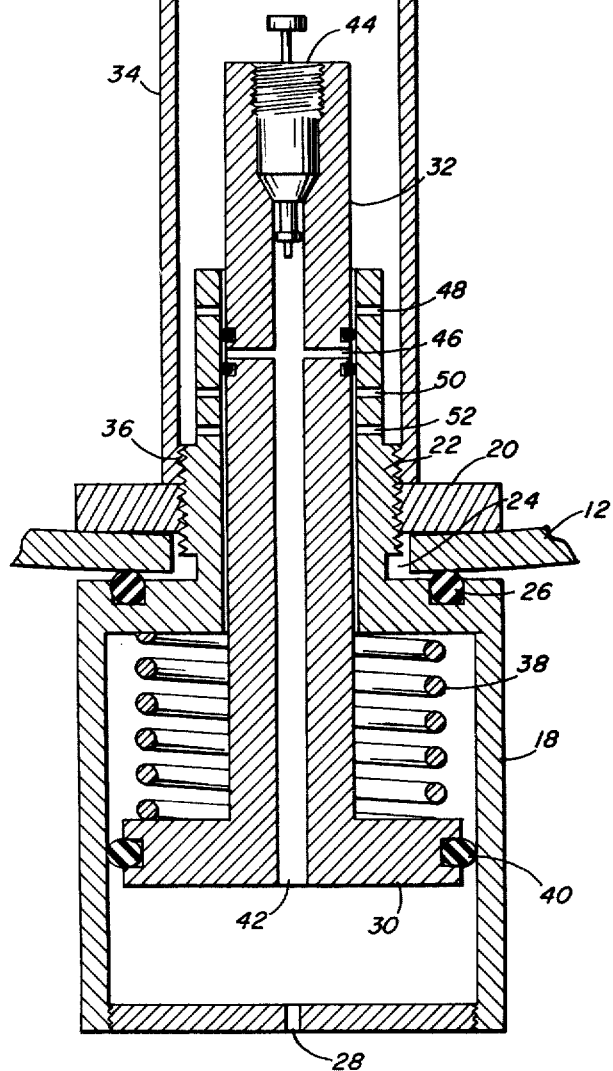
FIG. 1 is a sectional view in side elevation of a sonic signaling device made according to the invention and installed in a tire.

Referring now to the drawings and to FIG. 1 in particular, the reference character 10 generally indicates a pressure responsive signaling device mounted to each wheel 12 of a vehicle such as an automobile, bus, truck, airplane or the like. The device is adapted to emit a sonic signal whenever the tire pressure drops below or rises above a predetermined safe operating range. In general, the device 10 operates by actuating a whistle 14 through a release of air whenever the tire pressure becomes excessively high or low. The sound emitted by the whistle is sensed by means of a sensor 16 mounted on the vehicle's chassis and, through circuitry described below, is adapted to actuate a visual or audio alarm to alert the driver.

The device 10, in the illustrated embodiment, includes a cylinder 18 mountable within the tire chamber by means of a nut 20 threaded to a neck portion 22 of the cylinder extending through a valve stem aperture 24 formed in the wheel rim 12. An O-ring 26 is provided to form an air-tight seal between the rim and the cylinder when tightened in place by the nut 20.

The cylinder 18 is formed with one or more openings 28 communicating with the interior of the tire whereby the pressure within the cylinder below a piston 30 normally corresponds with the air pressure within the tire. The opening 28, however, is made small so that sharp changes in pressure which might, for example, be occasioned by the tire encountering a pothole in the road will not be transmitted into the cylinder 18. Rather, only those changes in pressure which occur over a substantial period of time, such as perhaps five seconds or more, will be transmitted. The piston 20 is slidably mounted within the cylinder 18 and is formed with an elongated stem 32 extending upwardly through the neck portion 22 into a housing 34 supporting the whistle 14. The housing 34 is detachably connected to the neck portion 22 as by threads 36 at the lower end thereof.

The piston 30 is normally urged downwardly by means of a compressed spring 38 coiled about the valve stem. An O-ring 40 is provided about the piston to form a sliding seal with the cylinder wall.

The piston 30, as well as its stem 32 is formed with a passage 42 open at its lower end to the cylinder 18 and closed at its upper end by means of a conventional air valve 44. The valve 44 is used to add air to the tire as necessary, this being done by simply unscrewing the housing 34 to make the air valve 44 accessible. The stem 32 is formed with transverse passages 46 communicating with the longitudinal passage 42.

Upon reciprocation of the piston and stem, the passage 46 is adapted to register with ports 48, 50 or 52 spaced along the upper portion of the neck 22. Assuming the air pressure within the tire builds up, this will cause the piston to move upwardly and, if the pressure is excessive, the transverse passage 46 will align with the uppermost port 48 to release pressurized air from the tire into the housing 34. The flow of air will move upwardly through the housing and through the whistle 14 to emit a sonic signal. At the same time, the whistle 14 itself will be displaced physically upward under the force of the released air insofar as the whistle is slidably mounted within the housing. Thus, the release of air not only generates a sonic signal to be detected by the vehicle sensing system, but also pushes out the whistle to provide a quick visual indicator for the operator once he has stopped his vehicle. In practice, the body of the whistle may be brightly colored in red or orange, for example, so that as the operator walks around the vehicle he may quickly observe which of the tires may be improperly inflated.

The device also serves to automatically correct an over-pressure condition insofar as when the pressure is excessive, air is bled off through the port 48 until the tire pressure reduces sufficiently for the piston to drop and the passage 46 to move back down into the safe operating range between ports 48 and 50.

By using two low-pressure ports 50 annd 52, two separate signals will be generated which may be utilized to indicate loss of air to the operator. If the low-pressure condition is merely the result of improper inflation, normally only the port 50 would be opened and a single signal produced. However, if the tire is leaking, pressure will continue to drop the ports 50 and 52 will open in succession producing two separate signals. The time lag between the signals from the ports 50 and 52 may be measured electronically by the sensing system and can indicate to the driver the rate of loss of pressure in the tire. In this fashion, the driver can make a judgement as to whether he may safely proceed to a service station or stop and take an immediate corrective action.

The whistle 14 may be fabricated to produce an audio emission of a very discrete frequency to which the sensing system will be pre-tuned so as to respond only to the frequency. Preferably, the whistle is fabricated to produce two or more simultaneous sonic emissions of different discrete frequencies and the sensing system will be tuned to respond only to that unique combination of frequencies. Also, the device may be designed to generate signals of different frequencies depending upon which port is opened by the stem 32. Thus, the frequency of the particular signal may be processed electrically so that the driver will be alerted as to the exact pressure condition.

Figure 2:
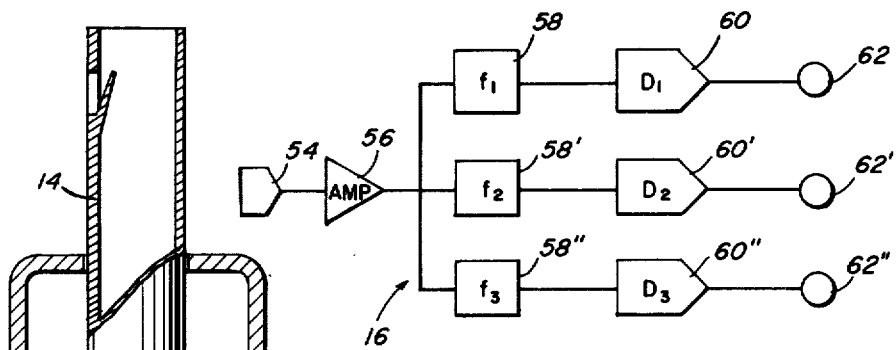
FIG. 2 is a block diagram of the sensing circuit mounted on the vehicle and adapted to respond to the emitted sonic signal.

Referring now to FIG. 2 of the drawings, there is illustrated a block diagram of a signal sensing circuit mounted to the vehicle's chassis. The circuit includes a sonic sensing transducer 54 such as a microphone located on the vehicle in position to detect a whistle sound emitted by a device 10 mounted on each wheel. In practice, a microphone 10 may be mounted in each wheel well or a single microphone may be centrally located to monitor a plurality of wheels depending upon the sensitivity of the pickup, distance and other factors.

In any event, the microphone 54 is adapted to detect an emitted sound and convert it to an electric signal which is then amplified by an amplifier 56, the output of the amplifier being fed into a bank of three parallel filters 58, 58', 58''. Each filter is designed to pass a single preset frequency. For example, the filter 58 is set to pass frequency $F_1$ which is the frequency of the high pressure signal produced by air escaping through port 48, $F_2$ being the low pressure warning signal resulting from the air escaping through port 50, and frequency $F_3$ representing the low pressure hazard signal resulting from air escaping through port 52. Depending upon the frequency of the particular signal, one of the filters 58 will pass a signal to an associated detector circuit 60, 60' or 60''. Connected to each of the detectors 60 is a lamp 62, 62' and 62'' or other signaling device. The detector circuit employs the output of the associated filter circuit to energize the lamp and latch the circuit so that the particular lamp remains lit until manually turned off. In practice, the lamps 62 are mounted on the dash board of the vehicle where they may be readily observed by the driver. In place of the lamps or in addition to the lamps other signaling devices such as buzzers or the like may be utilized to attract the driver's attention.

Figure 3:
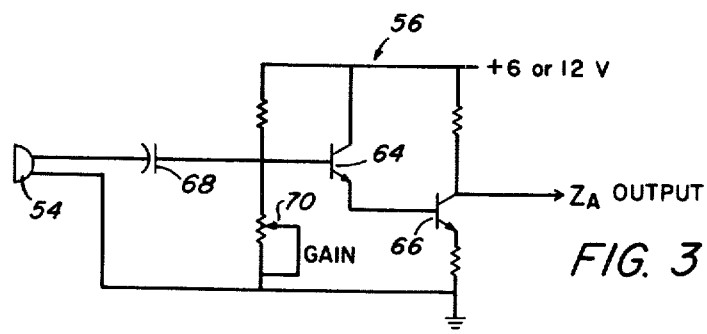
FIG. 3 is a circuit diagram of an amplifier employed in the sensing circuit.

Referring now to FIG. 3 of the drawings, there is illustrated a diagram of an amplifier circuit that may be used in the detecting system. The amplifier 56 receives the output of the microphone 54 and includes a pair of NPN transistors 64 and 66, the base of transistor 64 being connected to the microphone through a capacitor 68 and the emitter being connected to the base of the transistor 66. A variable resistor 70 provides gain control, the amplifier output coming from the collector of the transistor 66.

Figure 4:
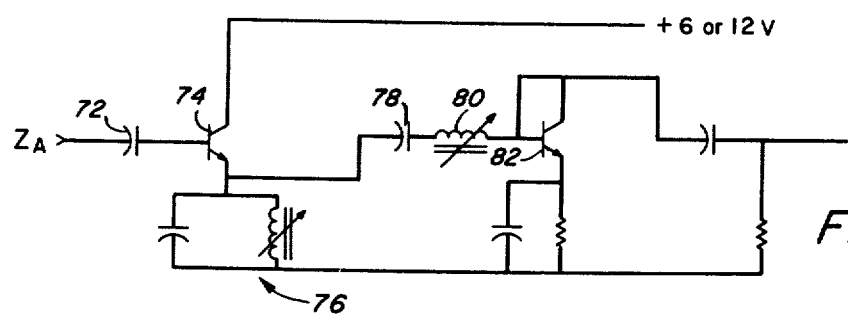
FIG. 4 is a circuit diagram of a filter circuit employed in the sensing circuit, and, FIG. 5 is a circuit diagram of a detector circuit employed in the sensing circuit.

In FIG. 4 there is a diagram of the filter circuit 58, the input being the output of the amplifier 56 fed through a capacitor 72 to the base of a transistor 74. The emitter of the transistor 74 is connected to a variable tank circuit 76 the output of which is connected through a capacitor 78 and a variable inductance 80 to the base of a transistor 82. The inductors of the filter circuit are tuned for the selected frequency which is to be detected, namely, frequency F1, F2 or F3. It will be understood that a filter circuit will be provided for each frequency and in the illustrated embodiment, three such circuits are provided, each tuned to a particular frequency.

Figure 5:
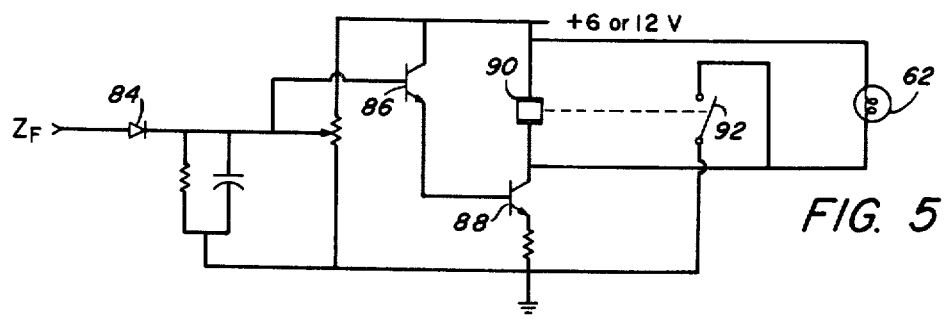

Referring now to FIG. 5 of the drawings, there is illustrated a circuit diagram for the detector circuit 60 for controlling each lamp 62. The input to the detector circuit 60 is the output of the associated filter circuit 58, the signal being fed through diode 84 and through an amplifier stage comprised of a pair of NPN transistors 86 and 88 operating a relay 90. The relay 90 controls a switch 92 which opens and closes a circuit to the lamp 62. It will be understood that a signal fed through the detecting circuit will energize the relay 90 to close the switch 92, latching the circuit to the lamp 62 and providing the desired indication.

Having thus described the invention, what I claim and desire to obtain by Letters Patent of the United States is:

1. A tire pressure warning system for vehicles, comprising in combination
   a. an air actuated sound emitting device mounted to said tire and adapted to emit a plurality of different predetermined sound signals according to a plurality of different predetermined tire pressures,
   b. a sound signal sensing device mounted to said vehicle for converting said sound signals into a plurality of different electrical signals,
   c. electrical signal processing means connected to said sound signal sensing device for selectively detecting said electrical signals, said processing means including a plurality of electrical filters each tuned to a different frequency and,
   d. multiple output alarm means connected to said processing means for generating a distinctive alarm signal in accordance with the particular signal detected.

2. A tire pressure warning system according to claim 1 wherein said sensing device is a microphone.

3. A tire pressure warning system according to claim 1 including a latching circuit connected between each of said filters and said alarm means.

4. A tire pressure warning system according to claim 3 wherein said alarm means includes a lamp connected to each latching circuit connected between each of said filters and said alarm means.

5. A tire pressure warning system according to claim 1 wherein said sound emitting device includes a housing mounted to said tire and formed with a cylinder therein, a spring loaded piston mounted for reciprocating movement in said cylinder in response to pressure changes in said tire, said piston being formed with a portion extending through said housing exterior of said tire, said piston and portion being formed with a passage communicating at one end with the interior of said tire, one of said piston portion and said housing being formed with a plurality of spaced first ports and the other of said piston portion and housing being formed with at least one second port, the port of said piston portion communicating with said passage and whistle means communicating with said ports.

* * * * *